(12) United States Patent
Yoda

(10) Patent No.: US 6,239,818 B1
(45) Date of Patent: May 29, 2001

(54) PRINTING METHOD AND APPARATUS

(75) Inventor: Akira Yoda, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/384,555

(22) Filed: Aug. 27, 1999

(30) Foreign Application Priority Data

Aug. 28, 1998 (JP) .................................................. 10-243377
Aug. 28, 1998 (JP) .................................................. 10-243378

(51) Int. Cl.[7] ...................................................... B41J 2/21
(52) U.S. Cl. .................................. 347/43; 347/3; 358/75
(58) Field of Search .................................. 347/43, 40, 3; 358/532, 539, 462, 538, 530, 464, 432, 448, 75, 78, 80; 283/73

(56) References Cited

U.S. PATENT DOCUMENTS 4,725,079 * 2/1988 Koza et al. ............................. 283/73
5,361,147 * 11/1994 Katayama et al. .................... 358/532

FOREIGN PATENT DOCUMENTS 8289159  11/1996 (JP) .
9214636   8/1997 (JP) .
10108180  4/1998 (JP) .

OTHER PUBLICATIONS

"Electronic Watermark", Kishio Matsui, O plus E, No. 213, Aug. 1997.

* cited by examiner

Primary Examiner—N. Le
Assistant Examiner—Lamson D. Nguyen

(57) ABSTRACT

In a printing method for embedding a pattern signal, which represents a predetermined pattern, into color print signals, and printing an image, in which the predetermined pattern has been embedded, the color print signals are modulated such that signal components of the color print signals corresponding to a pattern area, into which the pattern is embedded, approximately undergo conditional color matching with signal components of the color print signals corresponding to the other area. Modulated print signals are obtained from the modulation, and the printing is performed in accordance with the modulated print signals. Various kinds of information, such as information for prevention of illegal duplication and merchandise control information, can thus be embedded with a simple technique into a print.

54 Claims, 5 Drawing Sheets

PRINTING METHOD AND APPARATUS

BACKGROUND OF THE INVENTION

1. Field of the Invention

This invention relates to a printing method and apparatus for embedding predetermined pattern signal into color print signals, and printing an image in which the predetermined pattern has been embedded. This invention also relates to a pattern read-out method and apparatus for reading out the embedded pattern from the image having been obtained with the printing method. This invention further relates to a printing method and apparatus for transforming an image signal, in which deep-encrypted subsidiary information has been embedded, into a print signal, and performing a printing operation in accordance with the print signal. This invention still further relates to a recording medium, on which a program for causing a computer to execute the printing method or the pattern read-out method has been recorded and from which the computer is capable of reading the program.

2. Description of the Prior Art

In cases where a photographic original image is to be utilized as an original image for printing, the photographic original image is read out with a scanner, or the like, R, G, and B component digital signals are thereby obtained, and separated plate signals for printing are formed from the digital signals.

As color components of the separated plate signals, four color components, i.e., cyan (C), magenta (M), yellow (Y), which are the three primary colors in ordinary printing, and K for reproduction of a character pattern or a shadow area of an object, are often utilized. Also, where a color reproduction range is wide, or such that a bright image may be obtained, six color components further containing green (G) and orange (O) inks, or more color components are often utilized.

When the R, G, and B color signals are transformed into the C, M, Y, and K color signals (or the C, M, Y, G, O, and K color signals), transform parameters are set such that the original image can be reproduced. In such cases, various parameters for optimizing the addition of, particularly, K are utilized by considering printing stability, the ink cost, and the like.

Photographic original images and printed matter are valuable as creative works and therefore have copyrights. Accordingly, it is necessary to prevent illegal duplication. Also, certain kinds of printed matter, such as banknotes, securities, and tickets, are realizable and should be prevented from illegal duplication completely. However, recently, color scanners and printers capable of forming images having good image quality at low costs, widely available, and the duplication technology is advancing rapidly.

In order to prevent the illegal duplication described above, various kinds of special printing methods particularly aiming at prevention of forgery of banknotes have heretofore been utilized. Examples of such special printing methods include marking paper with a watermark, embedding a UV ink or a metal belt into paper, and utilizing microcharacters.

However, the printing methods described above require special techniques, and limitation is imposed upon print shops capable of performing the special printing methods. Also, the cost of special printing methods described above are high. Therefore, for certain lowcost items such as cheap tickets, the special printing methods described above is not economically viable way to protect copyrights. Also there are few other countermeasures for prevention of illegal duplication.

In the cases of printing of merchandise packages, it is necessary for merchandise control information for quality and distribution to be printed. The merchandise control information includes the date of production, a lot number, a price, and the like. Ordinarily, the merchandise control information is printed as a character pattern or a bar code. However, in cases where the merchandise control information is printed as a character pattern or a bar code, the freedom of package design becomes constrained. Therefore, it is desired that the merchandise control information can be printed as imperceptibly as possible.

SUMMARY OF THE INVENTION

The primary object of the present invention is to provide a printing method, wherein various kinds of information, such as information for prevention of illegal duplication and merchandise control information, are capable of being embedded with a simple technique into a print.

Another object of the present invention is to provide a pattern read-out method, wherein embedded information is read out from a print having been obtained with the printing method.

A further object of the present invention is to provide a printing method, wherein a print is formed from an image signal, in which deep-encrypted subsidiary information has been embedded, such that the printed image has good image quality and the subsidiary information is appended to the print.

A still further object of the present invention is to provide an apparatus for carrying out the printing method.

Another object of the present invention is to provide an apparatus for carrying out the pattern read-out method.

A further object of the present invention is to provide a recording medium, on which a program for causing a computer to execute the printing method has been recorded and from which the computer is capable of reading the program.

A still further object of the present invention is to provide a recording medium, on which a program for causing a computer to execute the pattern read-out method has been recorded and from which the computer is capable of reading the program.

The present invention provides a first printing method, wherein a pattern signal, which represents a predetermined pattern, is embedded into color print signals, and an image, in which the predetermined pattern has been embedded, is printed, the method comprising the steps of:

i) modulating the color print signals such that portions of the color print signals corresponding to a pattern area, into which the pattern is embedded, undergo conditional color matching with portions of the color print signals corresponding to the non-pattern area, modulated print signals being obtained from the modulation, and ii) printing in accordance with the modulated print signals.

The term "modulating color print signals such that signal components undergo conditional color matching" as used herein for the first printing method the means that the color print signals are modulated such that the color of the pattern area and the color of the non-pattern area are perceived as being identical under an ordinary viewing illuminant and are perceived as being different under a specific viewing illuminant. In other words, conditions are set such that the difference between the color of the pattern area and the color of the non-pattern area cannot be perceived under the ordinary viewing illuminant and can be perceived under a specific viewing illuminant.

The first printing method in accordance with the present invention is preferably modified such that the color print signals are composed of C, M, Y, and K color components, and values of at least the K signal, the four color signals, are altered such that the signal portions of the color print signals corresponding to the pattern area undergo the conditional color matching with the portions of the color print signals corresponding to the non-pattern area.

The present invention also provides a pattern read-out method for reading out the pattern from the image having been obtained with the first printing method in accordance with the present invention, wherein the pattern is read out with detection means, which has spectral sensitivity characteristics different from the spectral sensitivity characteristics of the human eyes.

The present invention further provides a first printing apparatus, wherein a predetermined pattern signal is embedded into color print signals, and an image, in which the predetermined pattern has been embedded, is printed, the apparatus comprising:

i) modulation means for modulating the color print signals such that portions of the color print signals corresponding to a pattern area, into which the pattern is embedded, undergo conditional color matching with portions of the color print signals corresponding to the non-pattern area, modulated print signals being obtained from the modulation, and ii) printing means for printing in accordance with the modulated print signals.

The first printing apparatus in accordance with the present invention is preferably modified such that the color print signal is composed of C, M, Y, and K four color components and the modulation means alters values of at least the K components such that the portions of the color print signals corresponding to the pattern area undergo the conditional color matching with the portions of the color print signals corresponding to the non-pattern area.

The present invention still further provides a pattern read-out apparatus for reading out the pattern from the image having been obtained with the first printing apparatus in accordance with the present invention, the apparatus comprising detection means, which has spectral sensitivity characteristics different from the spectral sensitivity characteristics of the human eyes.

The present invention also provides a recording medium, on which a program for causing a computer to execute the first printing method or the pattern read-out method in accordance with the present invention has been recorded and from which the computer is capable of reading the program.

The present invention further provides a second printing method, wherein an image signal, into which subsidiary information having been deep-encrypted with a predetermined deep encryption technique has been embedded, is transformed into a print signal, and printing is performed in accordance with the print signal, the method comprising the steps of:

i) separating the subsidiary information from the image signal, a separated image signal free from the subsidiary information being obtained from the separation, ii) transforming the separated image signal into the print signal, and iii) embedding the subsidiary information into the print signal with a technique different from the predetermined deep encryption technique.

In the second printing method in accordance with the present invention, the embedding of the subsidiary information into the print signal may be performed on the print signal after being obtained from the transform. Alternatively, the embedding of the subsidiary information into the print signal may be performed simultaneously with the transform of the separated image signal into the print signal.

The second printing method in accordance with the present invention is preferably modified in the manner described below. Specifically, the print signal is modulated such that signal components of the print signal corresponding to a subsidiary information area undergo conditional color matching with signal components of the print signal corresponding to the non-subsidiary information area.

The term "modulating a print signal such that signal components undergo conditional color matching" as used herein for the second printing method in accordance with the present invention means that the print signal is modulated such that the color of the subsidiary information area and the color of the non-subsidiary information area are perceived as being identical under an ordinary viewing illuminant and are perceived as different under a specific viewing illuminant. In other words, conditions are set such that the difference between the color of the subsidiary information area and the color of the non-subsidiary information area cannot be perceived under an ordinary viewing illuminant and can be perceived under a specific viewing illuminant.

Also, the second printing method in accordance with the present invention is preferably modified such that the print signal is composed of C, M, Y, and K color components, and values of at least the K components are altered such that the portions of the print signal corresponding to the subsidiary information area, into which the subsidiary information is embedded, undergo the conditional color matching with the portions of the print signal corresponding to the non-subsidiary information area.

The present invention still further provides a second printing apparatus, wherein an image signal, into which subsidiary information having been deep-encrypted with a predetermined deep encryption technique has been embedded, is transformed into a print signal, and printing is performed in accordance with the print signal, the apparatus comprising:

i) separation means for separating the subsidiary information from the image signal, a separated image signal free from the subsidiary information being obtained from the separation, ii) transform means for transforming the separated image signal into the print signal, and iii) embedding means for embedding the subsidiary information into the print signal with a technique different from the predetermined deep encryption technique.

The second printing apparatus in accordance with the present invention is preferably modified such that the embedding means modulates the print signal such that portions of the print signal corresponding to a subsidiary information area, into which the subsidiary information is embedded, undergo conditional color matching with portions of the print signal corresponding to the other area, where the print signal, into which the subsidiary information has been embedded, is obtained from the modulation.

Also, the second printing apparatus in accordance with the present invention is preferably modified such that the print signal is composed of C, M, Y, and K color components, and the embedding means alters values of at least the K components such that the signal components of the print signal corresponding to the subsidiary information area, into which the subsidiary information is embedded, undergo the conditional color matching with the portions of the print signal corresponding to the non-subsidiary information area.

The present invention also provides a recording medium, on which a program for causing a computer to execute the second printing method in accordance with the present invention has been recorded and from which the computer is capable of reading the program.

With the first printing method and apparatus in accordance with the present invention, the color print signals are modulated such that the portions of the color print signals corresponding to the pattern area, into which the pattern is embedded, undergo conditional color matching with the portions of the color print signals corresponding to the non-pattern area. Therefore, when the print is seen under an an ordinary viewing illuminant, the color of the pattern area and the color of the non-pattern area are perceived as being identical. When the print is seen under a specific viewing illuminant, they are perceived as being different.

In this manner, the information for preventing illegal duplication described above and the merchandise control information can be embedded in the print such that the information cannot be perceived easily.

For example, where copyright materials are concerned, an originating information can be embedded in the print such that it cannot be perceived by illegal users. The information of the print can be obtained by reading the pattern under a specific viewing illuminant to confirm the origin of the print, and the like. Also for example, where merchandise packaging is concerned the merchandise control information, such as a bar code, can be embedded to be perceptible under an ordinary viewing illuminant. Therefore, no limitation is imposed upon the design of the merchandise package, and the like, and designing can be performed freely.

With the second printing method and apparatus in accordance with the present invention, the subsidiary information is separated from the image signal, where in the subsidiary information has been deep-encrypted with the predetermined deep encryption technique. The separated image signal is transformed into a print signal, and the subsidiary information is embedded into the print signal with a technique different from the predetermined deep encryption technique.

Therefore, the subsidiary information appears as noise in the print where the image before separation, is directly transformed into the print signal. By separating the image signal as described, a printed image having good image quality can be obtained.

Also, if the subsidiary information is merely separated from the image signal so as to eliminate noise, the subsidiary information becomes removed from the print obtained from the printing and cannot be appended to the print.

Further, with the second printing method and apparatus in accordance with the present invention, wherein the print signal is modulated such that the signal components of the print signal corresponding to the subsidiary information area, into which the subsidiary information is embedded, undergo conditional color matching with the signal components of the print signal corresponding to the non-subsidiary information area. the advantages described below can be obtained.

Specifically, when the print is seen under an ordinary viewing illuminant, the color of the subsidiary information area and the color of the non-subsidiary information area are perceived as being identical. When the print is seen under a specific viewing illuminant, the colors are perceived as being different. Therefore, conditions for the conditional color matching may be set such that the difference between the color of the subsidiary information area and the color of the non-subsidiary information area cannot be perceived under the ordinary viewing illuminant. In this manner, the subsidiary information can be embedded in the print such that the subsidiary information cannot be perceived easily. Accordingly, in cases where the subsidiary information is the information concerning the copyright of the print, the copyright information can be embedded in the print such that it cannot be perceived by illegal users. The copyright information of the print can be obtained by reading the subsidiary information under a specific viewing illuminant. In this manner, the origin of the print, and the like, can be confirmed.

DESCRIPTION OF THE PREFERRED EMBODIMENTS

The present invention will hereinbelow be described in further detail with reference to the accompanying drawings.

Figure 1:
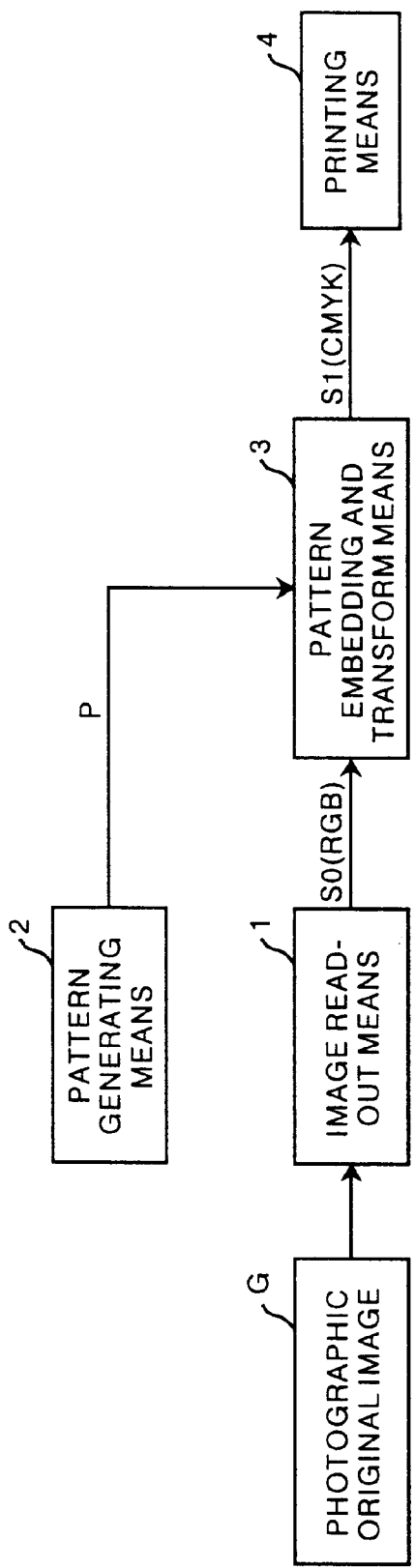
FIG. 1 is a block diagram showing a first embodiment of the printing apparatus in accordance with the present invention.

FIG. 1 is a block diagram showing a first embodiment of the printing apparatus in accordance with the present invention. With reference to FIG. 1, the printing apparatus comprises image read-out means 1, such as a scanner, for reading out a photographic original image G and obtaining image signals S0, which are composed of R, G, and B color image signals. The printing apparatus also comprises pattern generating means 2 for generating a pattern, which is to be embedded in a print, as a bit pattern P. The printing apparatus further comprises pattern embedding and transform means 3 for embedding the bit pattern P into the image signals S0, transforming the image signals S0 into C, M, Y, and K image signals, and obtaining print image signals S1, which are composed of C, M, Y, and K color image signals and into which the bit pattern P has been embedded. The printing apparatus still further comprises printing means 4 for printing on paper in accordance with the print image signals S1.

The pattern generating means 2 generates the pattern, which is to be embedded, as a bit pattern P, and feeds a modulation signal, which represents the bit pattern P, into the pattern embedding and transform means 3.

Examples of the pattern to be embedded include a character pattern or a logo representing the copyright of the photographic original image G. The character pattern, maybe encrypted. Also, in cases where the print is a merchandise package, the bit pattern P may be merchandise control information, such as bar code.

Figure 2:
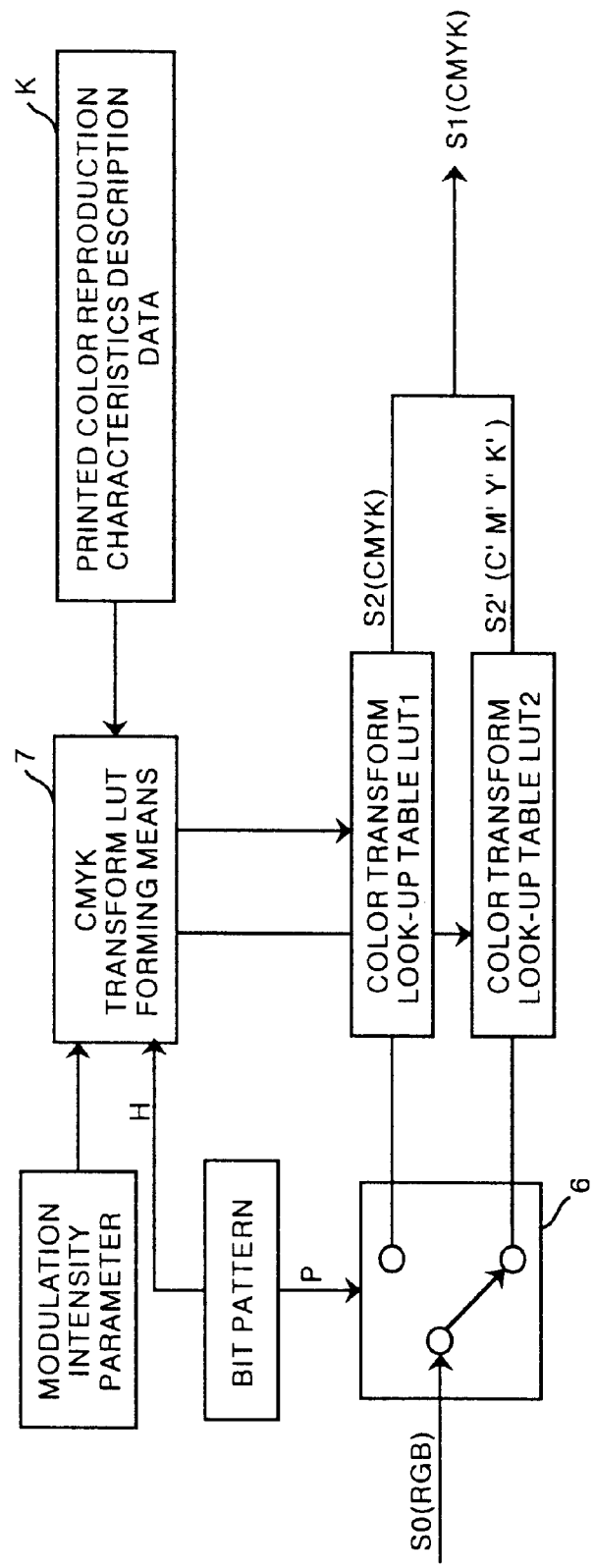
FIG. 2 is a block diagram showing pattern embedding and transform means.

The pattern embedding and transform means 3 transforms the RGB image signals S0 into the CMYK print image signals S1. The transform characteristics for the transform are modulated in accordance with the bit pattern P. In this manner, the bit pattern P is embedded into the print image signals S1. FIG. 2 is a block diagram showing the pattern embedding and transform means 3. If pattern P is binary, the pattern embedding and transform means 3 operates in the manner described below.

With reference to FIG. 2, a switch 6 selects whether the transform of a pixel value of a certain pixel in the image, which is represented by the image signals S0, from RGB into CMYK is to be performed with a color transform look-up table LUT1 or a color transform look-up table LUT2. The selection is made by changing over the switch 6 in accordance with whether the value of the bit pattern P corresponding to the pixel to be transformed is 1 or 0. In cases where the value of the bit pattern P is 0, the switch 6 selects the color transform look-up table LUT1. If the value of the bit pattern P is 1, the switch 6 selects the color transform look-up table LUT2.

The color transform look-up tables LUT1 and LUT2 are formed by CMYK transform LUT forming means 7. From the transform performed with the color transform look-up table LUT1, signals S2(CMYK) are obtained. From the transform performed with the color transform look-up table LUT2, signals S2'(C'M'Y'K') are obtained. The signals S2(CMYK) and the signals S2'(C'M'Y'K') have the relationship represented by Formula (1) shown below.

$$\text{Lab}\{CMYK(RGB)\}=\text{Lab}\{C'M'Y'K'(RGB)\} \quad (1)$$

in which Lab{ } represents the function giving CIE colorimetric values of the printed color corresponding to the CMYK signals, and CMYK( ) represents the transform formula for the transform of the RGB signals into the CMYK signals.

CMYK and C'M'Y'K' constitute a signal pair giving identical colorimetric values, i.e. conditional color matching pair, which has been calculated by the CMYK transform LUT forming means 7 from the same printed color reproduction characteristics description data K. Therefore, even though signals S2 and S2' are different from each other, can yield colors, which are perceived as being identical, on the print obtained from the printing means 4.

To summarize the pixel values of the pixels in the image represented by the image signals S0, in which pixels correspond to the area of the bit pattern P, are transformed with the color transform look-up table LUT2. Also, the pixel values of the pixels in the image represented by the image signals S0, in which pixels correspond to the area other than the bit pattern P, are transformed with the color transform look-up table LUT1. In this manner, the signals S2' and the signals S2 are obtained. The print image signals S1 are formed from the signals S2' and the signals S2, and the printing is performed by the printing means 4 in accordance with the print image signals S1. On the thus obtained print, the embedded pattern is ordinarily imperceptible with the human eyes.

Table 1 below shows examples of combinations of CMYK signals having the relationship of the conditional color matching described above, in which combinations have been calculated from color reproduction characteristics in a four-color offset printing machine. The combinations shown in Table 1 have been calculated such that the colors match with one another under a standard viewing illuminant of a color temperature of 5000 K. The combinations of CMYK signals having the relationship of the conditional color matching are not limited to those shown in Table 1, and various other combinations may be employed.

TABLE 1

|        | C  | M  | Y  | K  | L  | a | b |
|--------|----|----|----|----|----|---|---|
| Data A | 59 | 47 | 46 | 0  | 50 | 0 | 0 |
| Data B | 53 | 43 | 40 | 10 | 50 | 0 | 0 |
| Data C | 32 | 27 | 24 | 40 | 50 | 0 | 0 |

When the color transform look-up tables LUT1 and LUT2 are formed by the CMYK transform LUT forming means 7, a modulation intensity parameter H may be specified. In this manner, the intensity of modulation of the embedded bit pattern P can be altered.

For example, in cases where data A shown in Table 1 above is employed as the CMYK signals and data B shown in Table 1 above is employed as the C'M'Y'K' signals, the intensity of modulation of the bit pattern P is comparatively low. Therefore, in such cases, even if the viewing illuminant changes slightly, the bit pattern P cannot be perceived easily. Such setting is appropriate for applications, in which importance is attached to imperceptibility.

In cases where the data A shown in Table 1 above is employed as the CMYK signals and data C shown in Table 1 above is employed as the C'M'Y'K' signals, the intensity of modulation of the bit pattern P becomes comparatively high. Therefore, in such cases, the embedded bit pattern P cannot be perceived under the standard viewing illuminant and can be detected easily under a different viewing illuminant. Such setting is appropriate for applications, in which importance is attached to detectability.

In cases where the bit pattern P is a multi-valued pattern, the bit values of the bit pattern P may be utilized as the modulation intensity. In such cases, the signal representing the bit pattern P is fed as the modulation intensity parameter H into the CMYK transform LUT forming means 7. In cases where the value of the bit pattern P is large, the data, which is among the conditional color matching combinations and which contains a large K value, is selected. In cases where the value of the bit pattern P is small, the data, which is among the conditional color matching combinations and which contains a small K value, is selected. In this manner, the pattern having gradation in accordance with the bit pattern P can be embedded.

Figure 3:
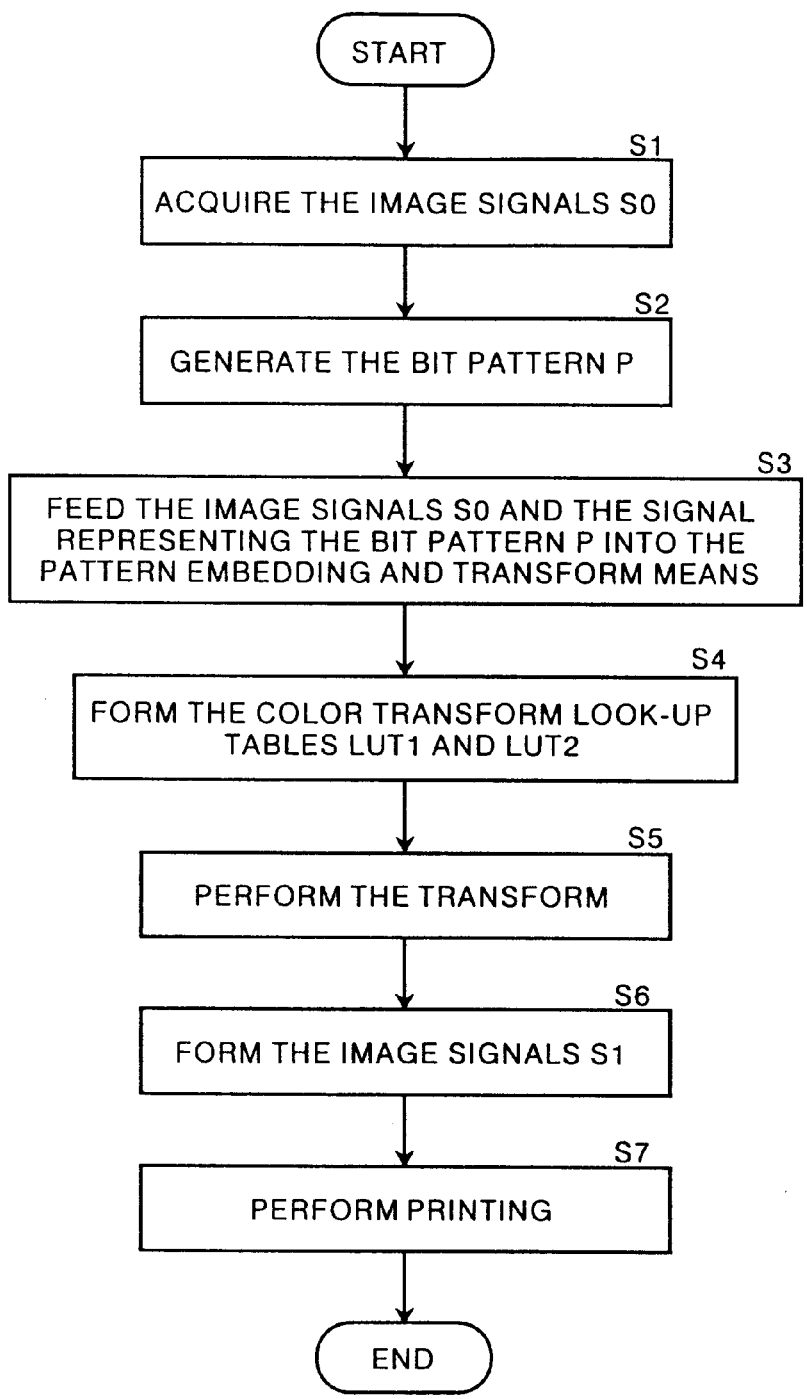
FIG. 3 is a flow chart showing how processing is performed in the first embodiment.

The first embodiment of the printing apparatus in accordance with the present invention operates will be described hereinbelow. FIG. 3 is a flow chart showing the processing steps performed in the first embodiment. Firstly, in step S1, the photographic original image G is read out by the image read-out means 1, and the RGB image signals S0 are acquired. In step S2, the bit pattern P to be embedded is generated by the pattern generating means 2. In step S3, the image signals S0 and the signal representing the bit pattern P are fed into the pattern embedding and transform means 3. In step S4, the color transform look-up tables LUT1 and LUT2 are formed by the CMYK transform LUT forming means 7 of the pattern embedding transform means 3 and in accordance with the bit pattern P and the modulation intensity parameter H.

In a step S5, the image signals S0 are transformed in accordance with the bit pattern P. Specifically, the pixel values of the pixels in the image represented by the image signals S0 corresponding to the area of the bit pattern P, are transformed with the color transform look-up table LUT2 into the image signals S2'(C'M'Y'K'). On the other hand, the pixel values of the pixels corresponding to the area other than the bit pattern P are transformed with the color transform look-up table LUT1 into the image signals S2(CMYK).

In a step S6, the print image signals S1(CMYK) representing the image, in which the bit pattern P has been embedded, are formed from the image signals S2' and the image signals S2. In a step S7, the print image signals S1 are fed into the printing means 4, and a visible image represented by the print image signals S1 is printed on paper.

The thus obtained print has the characteristics described below. Specifically, when the print is seen under an ordinary viewing illuminant, the embedded pattern cannot be perceived. However, the embedded pattern can be read out and detected with a read-out apparatus having spectral sensitivity characteristics different from the spectral sensitivity characteristics of the human eyes. Such apparatuses include an apparatus utilizing a three-wavelength type fluorescent lamp as the reading illuminant and detecting an image with a CCD image sensor, an apparatus utilizing an LED illuminant, a scanner utilizing a sensor having sensitivity to the infrared region, or the like.

With the embodiment described above, in the step S5 the image signals S0(RGB) are modulated such that the pixels corresponding to the bit pattern P, undergo conditional color matching with the pixels corresponding to the non-bit pattern area. Therefore, when the print is seen under a certain viewing illuminant, the color of the pattern area and the color of the other area are perceived being identical. When the print is seen under a specific viewing illuminant, the color of the pattern area is perceived as being different from the color of the non-pattern area. As a result, the information for preventing illegal duplication and the merchandise control information can be embedded in the print such that the information cannot be perceived easily.

Accordingly, in cases where the pattern P is the information concerning the copyright of the print, the copyright information can be embedded in the print such that it cannot be perceived by illegal users. Also, the copyright information of the print can be obtained by reading the pattern P under a specific viewing illuminant. In this manner, the origin of the print, and the like, can be confirmed.

Further, for merchandise packaging the merchandise control information, such as a bar code, is not perceptible under an ordinary viewing illuminant. Therefore, no limitation is imposed upon the design of the merchandise package, and the like, and designing can be performed freely.

A second embodiment of the first printing apparatus in accordance with the present invention will be described hereinbelow. In the second embodiment, subsidiary information F, such as copyright information or merchandise control information, is deep-encrypted and embedded as the so-called "electronic watermark" into image signals S0. In this manner, image signals S0', into which the subsidiary information F has been embedded, are obtained. When the printing is to be performed in accordance with the image signals S0', the subsidiary information F is read out from the image signals S0'. The subsidiary information F is then embedded as a bit pattern into the image signals S0', and the transform into CMYK is performed. In this manner, print image signals S1'(CMYK) are obtained. (The second embodiment of the first printing apparatus in accordance with the present invention embraces an embodiment of the second printing apparatus in accordance with the present invention.)

Figure 4:
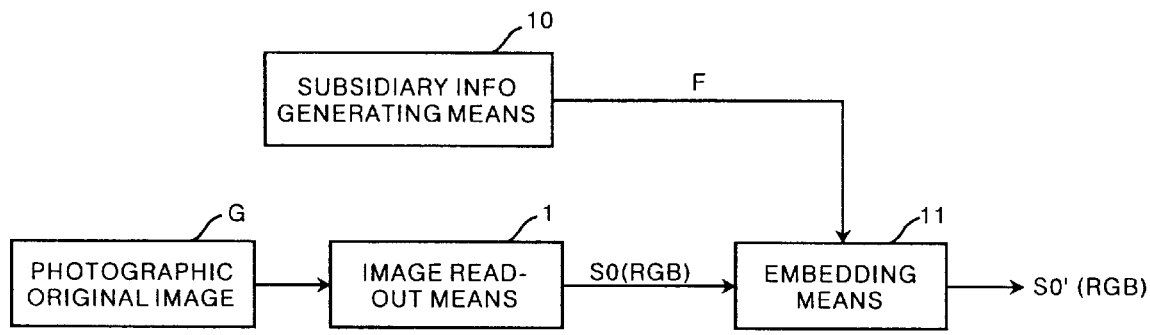
FIG. 4 is a block diagram showing a subsidiary information embedding apparatus for obtaining an image signal to be utilized in a second embodiment of the printing apparatus in accordance with the present invention.

FIG. 4 is a block diagram showing an embedding apparatus for embedding the subsidiary information into the image signals utilized in the second embodiment. As illustrated in FIG. 4, the embedding apparatus comprises the image read-out means 1 for reading out the photographic original image G and obtaining the image signals S0(RGB) in the same manner as that in the aforesaid first embodiment. The embedding apparatus also comprises subsidiary information generating means 10 for generating the subsidiary information F to be embedded into the image signals S0. The embedding apparatus further comprises embedding means 11 for deep-encrypting the subsidiary information F, embedding the deep-encrypted subsidiary information F into the image signals S0, and thereby obtaining the image signals S0', into which the subsidiary information F has been embedded.

As a technique for deep-encrypting the subsidiary information F and embedding it into the image signals S0, which may be employed in the embedding means 11, techniques described in, for example, Japanese Unexamined Patent Publication Nos. 8(1996)-289159, 9(1997)-214636, and 10(1998)-108180 are known. With the known techniques, certification information or copyright information is embedded into a redundant part of a signal, such that the embedded information cannot be confirmed with mere reproduction of the image signal. However, it can be read out and, for example, displayed by utilizing an apparatus or software functions for reading out the information. The deep encryption techniques are described in various literatures (e.g., "Electronic Watermark" by Kishio Matsui, O plus E, No. 213. August 1997).

Deep encryption techniques of various types, such as a pixel space utilization type, a quantization error utilization type, and frequency domain utilization type, are known. With the pixel space utilization type of deep encryption technique, a plane of, e.g., 3×3 pixels in the vicinity of a certain pixel is taken out, and subsidiary information is embedded into peripheral 8 bits.

With the quantization error utilization type of deep encryption technique, quantization error occurring in the process of image signal compression is taken into consideration, a quantization output is controlled to even numbers and odd numbers with 0 and 1 of the bit string of the subsidiary information, and the subsidiary information is embedded as apparent quantization noise into the image signal. The quantization error utilization type of deep encryption technique is described in detail in "Image Deep Cryptogragh" by Kishio Matsui, Morikita Publishing Co., 1993.

With the frequency domain utilization type of deep encryption technique, subsidiary information is embedded into visually insensible frequency domain on an image domain. For example, high frequency components in an image represent a visually insensible domain. Therefore, an image signal is decomposed into a plurality of different frequency bands, the subsidiary information is embedded into the high frequency band, and an image signal is reconstructed. In this manner, the subsidiary information can be embedded. Also, ordinarily, the human visual characteristics are such that the gradation discriminating capability with respect to color difference or saturation information is lower than the gradation discriminating capability with respect to luminance information. A region allowing invisible recording is present at part of the difference between the luminance information and the color difference or saturation information. Therefore, the subsidiary information can be embedded in such a region.

Examples of other deep encryption techniques include a technique for embedding subsidiary information into a bit plane of a low signal-to-noise ratio in an image by mixing it with redundancy of noise, a technique for embedding subsidiary information into redundancy of information change in a pixel block (space) of a predetermined range, and a technique for embedding subsidiary information into quantization error occurring in cases where the amount of information degenerates due to encoding for signal compression.

Figure 5:
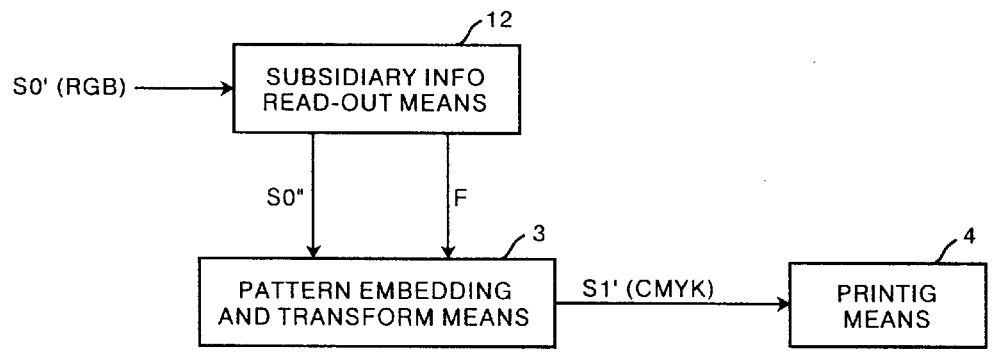
FIG. 5 is a block diagram showing the second embodiment of the printing apparatus in accordance with the present invention.

FIG. 5 is a block diagram showing the second embodiment of the printing apparatus in accordance with the present invention. With reference to FIG. 5, the printing apparatus comprises subsidiary information read-out means 12 for reading out the subsidiary information F from the image signals S0', which have been obtained from the embedding apparatus shown in FIG. 4, and obtaining the subsidiary information F and image signals S0", which is free of subsidiary information F. The printing apparatus also comprises the pattern embedding and transform means 3 for embedding the subsidiary information F as a bit pattern into the image signals S0", transforming the image signals S0" into C, M, Y, and K image signals, and obtaining the print image signals S1', which are composed of C, M, Y, and K color image signals and into which the subsidiary information F has been embedded. The printing apparatus further comprises the printing means 4 for printing on paper in accordance with the print image signals S1'.

In the same manner as the first embodiment described above, the pattern embedding and transform means 3 embeds the subsidiary information F as the bit pattern into the image signals S0" and obtains the print image signals S1'.

Figure 6:
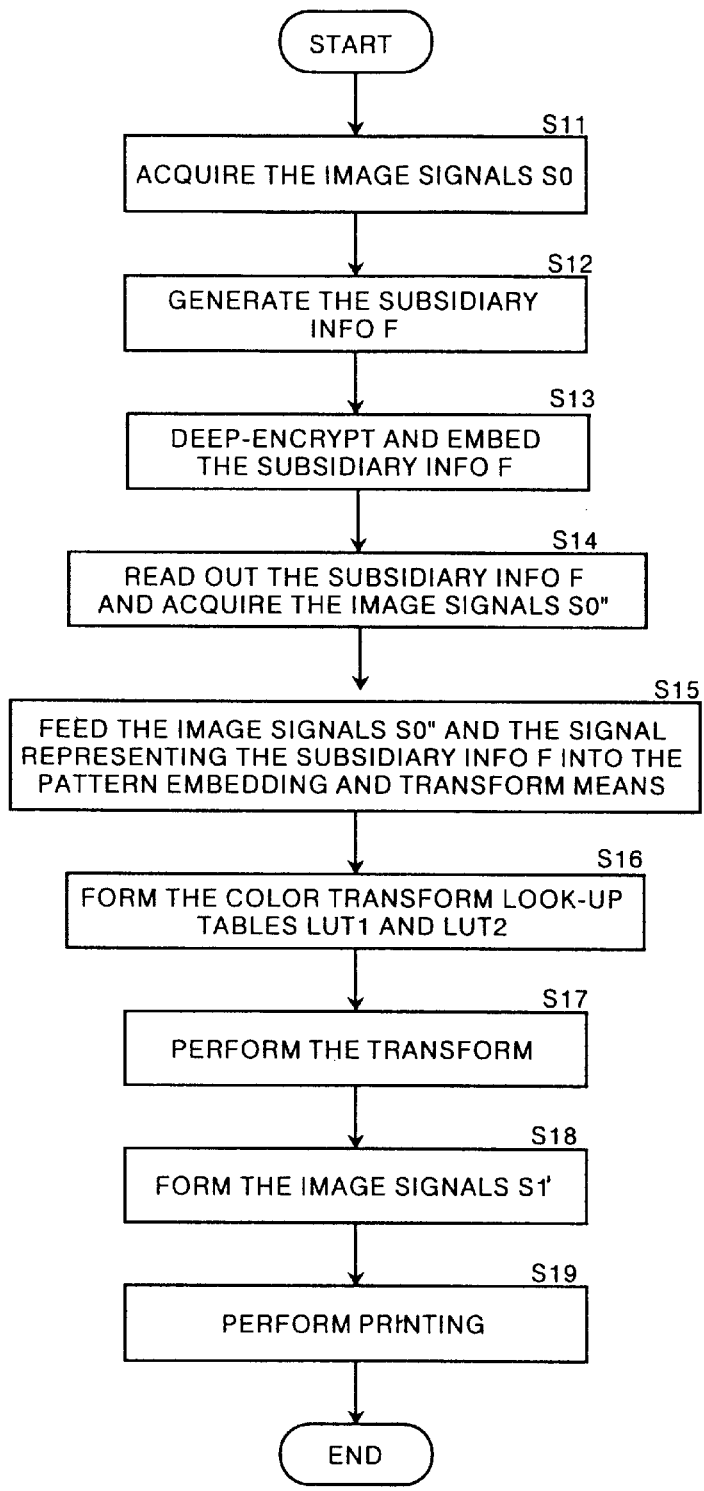
FIG. 6 is a flow chart showing how processing is performed in the second embodiment.

The operation of the second embodiment of the printing apparatus in accordance with the present invention will be described hereinbelow. FIG. 6 is a flow chart showing how processing is performed in the second embodiment. Firstly, in a step S11, the photographic original image G is read out by the image read-out means 1, and the RGB image signals S0 are acquired. In a step S12, the subsidiary information F is generated by the subsidiary information generating means 10. In a step S13, the subsidiary information F is deep-encrypted and embedded into the image signals S0 by the embedding means 11, and the image signals S0', into which the subsidiary information F has been embedded, are obtained.

Thereafter, in a step S14, in the printing apparatus, the image signals S0' are fed into the subsidiary information read-out means 12 to separate the subsidiary information F and the image signals S0"

In a step S15, the subsidiary information F and the image signals S0" are fed into the pattern embedding and transform means 3. In a step S16, the color transform look-up tables LUT1 and LUT2 are formed by the CMYK transform LUT forming means 7 of the pattern embedding and transform means 3 and in accordance with the subsidiary information F and the modulation intensity parameter H. In a step S17, the image signals S0" are transformed in accordance with the subsidiary information F. Specifically, the pixel values of the pixels in the image represented by the image signals S0"corresponding to the area of the subsidiary information F are transformed with the color transform look-up table LUT2 into the image signals S2'(C'M'Y'K'). Also, the pixel values of the pixels in the image represented by the image signals S0" corresponding to the non-subsidiary information F, are transformed with the color transform look-up table LUT1 into the image signals S2(CMYK). In a step S18, the print image signals S1'(CMYK) representing the image, in which the subsidiary information F has been embedded, are formed from the image signals S2' and the image signals S2. In a step S19, the print image signals S1' are fed into the printing means 4, and a visible image represented by the print image signals S1' is printed on paper.

With the second embodiment described above, in the step of transforming the image signals S0'(RGB) into the print image signals S1'(CMYK), the image signals S0'(RGB) are modulated such that the pixels corresponding to the subsidiary information F to be embedded, undergo conditional color matching with the pixels corresponding to the non-subsidiary information area. Therefore, when the print is seen under an ordinary viewing illuminant, the color of the subsidiary information area and the color of the non-subsidiary information area are perceived as being identical. When the print is seen under a specific viewing illuminant, the colors are perceived as being different. Therefore, the embedded subsidiary information F cannot be perceived under an ordinary viewing illuminant and can be perceived under only under a specific viewing illuminant. As a result, the information for preventing illegal duplication and the merchandise control information can be embedded in the print such that the information cannot be perceived easily.

Also, the image signals S0' contain the subsidiary information F embedded therein. Therefore, if a visible image is printed in accordance with the image signals S0', the subsidiary information F will appear as noise in the printed image, and the image quality of the printed image is not good. However, with the second embodiment described above, the subsidiary information F is separated from the image signals S0', and the image signals S0" free from the subsidiary information F are thereby obtained. Thereafter, the subsidiary information F is embedded as the bit pattern into the image signals S0", and the transform into the print image signals S1' is performed. Therefore, the subsidiary information F does not appear as noise in the printed image, and the printed image having good image quality can be obtained.

In the first and second embodiments described above, the printing is performed with the C, M, Y, and K colors. In an alternative orange (O) and green (G) can be added and the printing can be performed with the C, M, Y, G, O, K colors. The bit pattern P (or the subsidiary information F) can be embedded in the same manner as that described above. In such cases, the conditional color matching can be effected by, for example, altering the ratio of CY to G, or altering the ratio of MY to O. The conditional color matching can be also effected by altering the K value as shown in Table 1 above.

In the second embodiment described above, the subsidiary information F is set as the bit pattern. Also, the bit pattern area and the non-pattern area are subjected to the conditional color matching, and the bit pattern is thereby embedded into the print image signals S1'. Alternatively, the subsidiary information F may be embedded as an electronic watermark into the printing paper. As another alternative, the subsidiary information F may be printed with an UV ink. In such cases, the subsidiary information F can be perceived when it is exposed to ultraviolet light. As a further alternative, the subsidiary information F may be printed on a metal belt and may thereby be embedded in the print. As a still further alternative, the subsidiary information F may be embedded as a micro-character. As another alternative, the subsidiary information F may be embedded into a header area of the print image signals S1'.

What is claimed is:

1. A printing method, wherein a pattern signal, which represents a predetermined pattern, is embedded into color print signals, and an image, in which the predetermined pattern has been embedded, is printed, the method comprising the steps of:

i) modulating the color print signals such that signal components of the color print signals corresponding to a pattern area, into which the pattern is embedded, undergo conditional color matching with signal components of the color print signals corresponding to a non-pattern area, and ii) printing in accordance with said modulated print signals.

2. A printing method as defined in claim 1 wherein the color print signals are composed of C, M, Y, and K four color signals, and values of at least the K signal, which is among said four color signals, are altered such that the signal components of the color print signals corresponding to said pattern area, into which the pattern is embedded, undergo the conditional color matching with the signal components of the color print signals corresponding to said non-pattern area.

3. A pattern read-out method for reading out the pattern from the image having been obtained with a printing method as defined in claim 1 wherein the pattern is read out with detection means, which has spectral sensitivity characteristics different from the spectral sensitivity characteristics of the human eyes such that said detection means detects patterns in said image that is not detectable by the human eyes.

4. A recording medium, on which a program for causing a computer to execute a pattern read-out method has been recorded and from which the computer is capable of reading the program, the pattern read-out method comprising reading out the pattern from the image having been obtained with a printing method as defined in claim 1, wherein the program comprises the procedure of reading out the pattern with detection means, which has spectral sensitivity characteristics different from the spectral sensitivity characteristics of the human eyes such that said detection means detects patterns in said image that is not detectable by the human eyes.

5. A printing apparatus, wherein a pattern signal, which represents a predetermined pattern, is embedded into color print signals, and an image, in which the predetermined pattern has been embedded, is printed, the apparatus comprising:

i) modulation means for modulating the color print signals such that signal components of the color print signals corresponding to a pattern area, into which the pattern is embedded, undergo conditional color matching with signal components of the color print signals corresponding to the non-pattern area, modulated print signals being obtained from the modulation, and ii) printing means for performing the printing in accordance with said modulated print signals.

6. A printing apparatus as defined in claim 5 wherein the color print signals are composed of C, M, Y, and K four color signals, and said modulation means alters values of at least the K signal, which is among said four color signals, such that the signal components of the color print signals corresponding to said pattern area, into which the pattern is embedded, approximately undergo the conditional color matching with the signal components of the color print signals corresponding to said non-pattern area.

7. A pattern read-out apparatus for reading out the pattern from the image having been obtained with a printing apparatus as defined in claim 5, the pattern is read-out apparatus comprising detection means, which has spectral sensitivity characteristics different from the spectral sensitivity characteristics of the human eyes such that said detection means detects patterns in said image that is not detectable by the human eyes.

8. A recording medium, on which a program for causing a computer to execute a printing method has been recorded and from which the computer is capable of reading the program, the printing method comprising embedding a pattern signal, which represents a predetermined pattern, into color print signals, and printing an image, in which the predetermined pattern has been embedded, wherein the program comprises the procedures of:

i) modulating the color print signals such that signal components of the color print signals corresponding to a pattern area, into which the pattern is embedded, undergo conditional color matching with signal components of the color print signals corresponding to a non-pattern area, modulated print signals being obtained from the modulation, and ii) performing the printing in accordance with said modulated print signals.

9. A recording medium as defined in claim 8 wherein the color print signals are composed of C, M, Y, and K four color signals, and the procedure for obtaining said modulated print signals is a procedure for altering values of at least the K signal, which is among said four color signals, such that the signal components of the color print signals corresponding to said pattern area, into which the pattern is embedded, undergo the conditional color matching with the signal components of the color print signals corresponding to said a non-pattern area.

10. A printing method, wherein an image signal, into which subsidiary information having been deep-encrypted with a predetermined deep encryption technique has been embedded, is transformed into a print signal, and printing is performed in accordance with the print signal, the method comprising the steps of:

i) separating the subsidiary information from the image signal, a separated image signal free from the subsidiary information being obtained from the separation, ii) transforming said separated image signal into the print signal, and iii) embedding the subsidiary information into the print signal with a technique different from the predetermined deep encryption technique.

11. A printing method as defined in claim 10 wherein the print signal is modulated such that signal components of the print signal corresponding to a subsidiary information area, into which the subsidiary information is embedded, undergo conditional color matching with signal components of the print signal corresponding to a non-subsidiary information area.

12. A printing method as defined in claim 11 wherein the print signal is composed of C, M, Y, and K color signals, and values of at least the K signal, which is among said four color signals, are altered such that the signal components of the print signal corresponding to said subsidiary information area, into which the subsidiary information is embedded, undergo the conditional color matching with the signal components of the print signal corresponding to said non-subsidiary information area.

13. A printing apparatus, wherein an image signal, into which subsidiary information having been deep-encrypted with a predetermined deep encryption technique has been embedded, is transformed into a print signal, and printing is performed in accordance with the print signal, the apparatus comprising:

i) separation means for separating the subsidiary information from the image signal, a separated image signal free from the subsidiary information being obtained from the separation, ii) transform means for transforming said separated image signal into the print signal, and iii) embedding means for embedding the subsidiary information into the print signal with a technique different from the predetermined deep encryption technique.

14. A printing apparatus as defined in claim 13 wherein said embedding means modulates the print signal such that signal components of the print signal corresponding to a subsidiary information area, into which the subsidiary information is embedded, undergo conditional color matching with signal components of the print signal corresponding to a non-subsidiary information.

15. A printing apparatus as defined in claim 14 wherein the print signal is composed of C, M, Y, and K four color signals, and said embedding means alters values of at least the K signal, which is among said four color signals, such that the signal components of the print signal corresponding to said subsidiary information area, into which the subsidiary information is embedded, undergo the conditional color matching with the signal components of the print signal corresponding to said non-subsidiary information area.

16. A recording medium, on which a program for causing a computer to execute a printing method has been recorded and from which the computer is capable of reading the program, the printing method comprising transforming an image signal, into which subsidiary information having been deep-encrypted with a predetermined deep encryption technique has been embedded, into a print signal, and performing printing in accordance with the print signal, wherein the program comprises the procedures of:

i) separating the subsidiary information from the image signal, a separated image signal free from the subsidiary information being obtained from the separation, ii) transforming said separated image signal into the print signal, and iii) embedding the subsidiary information into the print signal with a technique different from the predetermined deep encryption technique.

17. A recording medium as defined in claim 16 wherein the procedure for embedding the subsidiary information into the print signal is a procedure for modulating the print signal such that signal components of the print signal corresponding to a subsidiary information area, into which the subsidiary information is embedded, undergo conditional color matching with signal components of the print signal corresponding to a non-subsidiary information area.

18. A recording medium as defined in claim 17 wherein the print signal is composed of C, M, Y, and K four color signals, and the procedure for embedding the subsidiary information into the print signal is a procedure for altering values of at least the K signal, which is among said four color signals, such that the signal components of the print signal corresponding to said subsidiary information area, into which the subsidiary information is embedded, undergo the conditional color matching with the signal components of the print signal corresponding to said non-subsidiary information area.

19. A method to print an embedded pattern in an image, comprising:

a) scanning said image to generate an original image signal;

b) generating a pattern signal representing said pattern to be embedded;

c) embedding said pattern signal to said original image signal to generate a final image signal such that a pattern area into which said pattern signal is embedded is conditionally color matched with a non-pattern area in said final image signal, wherein said conditionally matched colors appear to be identical under a normal illumination, but appear to be different under a special illumination; and d) printing according to said final image signal.

20. The method of claim 19, wherein said step c) comprises:

c1) generating a first transformation image signal via a first transformation of said original image signal corresponding to said pattern area;

c2) generating a second transformation image signal via a second transformation of said original image signal corresponding to said non-pattern area; and c3) combining said first and second image signals to generate said final image signal.

21. The method of claim 20, wherein said first transformation is accomplished through a first look-up table and said second transformation is accomplished through a second look-up table.

22. The method of claim 21, further comprising:

c4) generating values of said first and second look up table based on values of said original image signal.

23. The method of claim 19, wherein said original image signal is composed of R, G, and B components.

24. The method of claim 19, wherein said final image signal is composed of C, M, Y, and K components.

25. The method of claim 24, wherein values of said K component are altered to conditionally color match said pattern and non-pattern areas of said final image signal.

26. The method of claim 19, wherein said pattern may be one of a binary stream and a multi-valued stream.

27. The method of claim 19, wherein said final image signal is composed of C, M, Y, K, O, and G components.

28. An apparatus to print an embedded pattern in an image, comprising:

a scanner scanning said image to generate an original image signal;

a pattern signal generator generating a pattern signal representing said pattern to be embedded;

a pattern embedder embedding said pattern signal to said original image signal to generate a final image signal such that a pattern area into which said pattern signal is embedded is conditionally color matched with a non-pattern area in said final image signal, wherein said conditionally matched colors appear to be identical under a normal illumination, but appear to be different under a special illumination; and a printer printing according to said final image signal.

29. The apparatus of claim 28, further comprising:

a first transformer generating a first transformation image signal via a first transformation of said original image signal corresponding to said pattern area;

a second transformer generating a second transformation image signal via a second transformation of said original image signal corresponding to said non-pattern area; and a combining means combining said first and second image signals to generate said final image signal.

30. The apparatus of claim 29, wherein said first transformer is a first look-up table and said second transformer is a second look-up table.

31. The apparatus of claim 30, further comprising:
a look-up table generator generating values of said first and second look up table based on values of said original image signal.

32. The apparatus of claim 28, wherein said original image signal is composed of R, G, and B components.

33. The apparatus of claim 28, wherein said final image signal is composed of C, M, Y, and K components.

34. The apparatus of claim 33, wherein values of said K component are altered to conditionally color match said pattern and non-pattern areas of said final image signal.

35. The apparatus of claim 28, wherein said pattern may be one of a binary stream and a multi-valued stream.

36. The apparatus of claim 28, wherein said final image signal is composed of C, M, Y, K, O, and G components.

37. A method to print a deep-encrypted subsidiary information in an image, comprising:
a) scanning said image to generate an original image signal;
b) generating and deep-encrypting a subsidiary information signal;
c) electronically watermarking said deep-encrypted subsidiary information into said original image signal to generate a first intermediate image signal such that said subsidiary information appears as noise if said intermediate image signal is printed;
d) separating said first intermediate image signal into said deep-encrypted subsidiary information and a second intermediate image signal, said second intermediate image signal containing none of said deep-encrypted subsidiary information;
e) embedding said separated deep-encrypted subsidiary information signal to said second intermediate image signal to generate a final image signal such that a subsidiary information area into which said subsidiary information signal is embedded is conditionally color matched with a non-subsidiary information area in said final image signal, wherein said conditionally matched colors appear to be identical under a normal illumination, but appear to be different under a special illumination; and
f) printing according to said final image signal.

38. The method of claim 37, wherein said step e) comprises:
e1) generating a first transformation image signal via a first transformation of said original image signal corresponding to said pattern area;
e2) generating a second transformation image signal via a second transformation of said original image signal corresponding to said non-pattern area; and
e3) combining said first and second image signals to generate said final image signal.

39. The method of claim 38, wherein said first transformation is accomplished through a first look-up table and said second transformation is accomplished through a second look-up table.

40. The method of claim 39, further comprising:
c4) generating values of said first and second look up table based on values of said second intermediate image signal.

41. The method of claim 37, wherein said original image signal is composed of R, G, and B components.

42. The method of claim 37, wherein said final image signal is composed of C, M, Y, and K components.

43. The method of claim 42, wherein values of said K component are altered to conditionally color match said subsidiary information and non-subsidiary information areas of said final image signal.

44. The method of claim 37, wherein said final image signal is composed of C, M, Y, K, O, and G components.

45. An apparatus to print a deep-encrypted subsidiary information in an image, comprising:
a scanner scanning said image to generate an original image signal;
a subsidiary info generator generating a subsidiary information signal;
an encryptor deep-encrypting said subsidiary information signal;
a subsidiary information embedder electronically watermarking said deep-encrypted subsidiary information into said original image signal to generate a first intermediate image signal such that said subsidiary information appears as noise if said intermediate image signal is printed;
a subsidiary information separator separating said first intermediate image signal into said deep-encrypted subsidiary information and a second intermediate image signal, said second intermediate image signal containing none of said deep-encrypted subsidiary information;
a pattern embedder embedding said separated deep-encrypted subsidiary information signal to said second intermediate image signal to generate a final image signal such that a subsidiary information area into which said subsidiary information signal is embedded is conditionally color matched with a non-subsidiary information area in said final image signal, wherein said conditionally matched colors appear to be identical under a normal illumination, but appear to be different under a special illumination; and
a printer printing according to said final image signal.

46. The apparatus of claim 45, further comprising:
a first transformer generating a first transformation image signal via a first transformation of said original image signal corresponding to said pattern area;
a second transformer generating a second transformation image signal via a second transformation of said original image signal corresponding to said non-pattern area; and
a combining means combining said first and second image signals to generate said final image signal.

47. The apparatus of claim 46, wherein said first transformer is a first look-up table and said second transformer is a second look-up table.

48. The apparatus of claim 47, further comprising:
a look-up generator generating values of said first and second look up table based on values of said second intermediate image signal.

49. The apparatus of claim 45, wherein said original image signal is composed of R, G, and B components.

50. The apparatus of claim 45, wherein said final image signal is composed of C, M, Y, and K components.

51. The apparatus of claim 50, wherein values of said K component are altered to conditionally color match said subsidiary information and non-subsidiary information areas of said final image signal.

52. The method of claim 45, wherein said final image signal is composed of C, M, Y, K, O, and G components.

53. A recording medium on which a program to execute a printing method has been recorded and which a computer is capable of reading and executing the program, wherein said printing method includes:
   a) scanning said image to generate an original image signal;
   b) generating a pattern signal representing said pattern to be embedded;
   c) embedding said pattern signal to said original image signal to generate a final image signal such that a pattern area into which said pattern signal is embedded is conditionally color matched with a non-pattern area in said final image signal, wherein said conditionally matched colors appear to be identical under a normal illumination, but appear to be different under a special illumination; and
   d) printing according to said final image signal.

54. A recording medium on which a program to execute a printing method has been recorded and which a computer is capable of reading and executing the program, wherein said printing method includes:
   a) scanning said image to generate an original image signal;
   b) generating and deep-encrypting a subsidiary information signal;
   c) electronically watermarking said deep-encrypted subsidiary information into said original image signal to generate a first intermediate image signal such that said subsidiary information appears as noise if said intermediate image signal is printed;
   d) separating said first intermediate image signal into said deep-encrypted subsidiary information and a second intermediate image signal, said second intermediate image signal containing none of said deep-encrypted subsidiary information;
   e) embedding said separated deep-encrypted subsidiary information signal to said second intermediate image signal to generate a final image signal such that a subsidiary information area into which said subsidiary information signal is embedded is conditionally color matched with a non-subsidiary information area in said final image signal, wherein said conditionally matched colors appear to be identical under a normal illumination, but appear to be different under a special illumination; and
   f) printing according to said final image signal.

* * * * *